J. THOMPSON.
POTATO GRADING MACHINE.
APPLICATION FILED MAY 29, 1920.
1,431,270.
Patented Oct. 10, 1922.
3 SHEETS—SHEET 1.
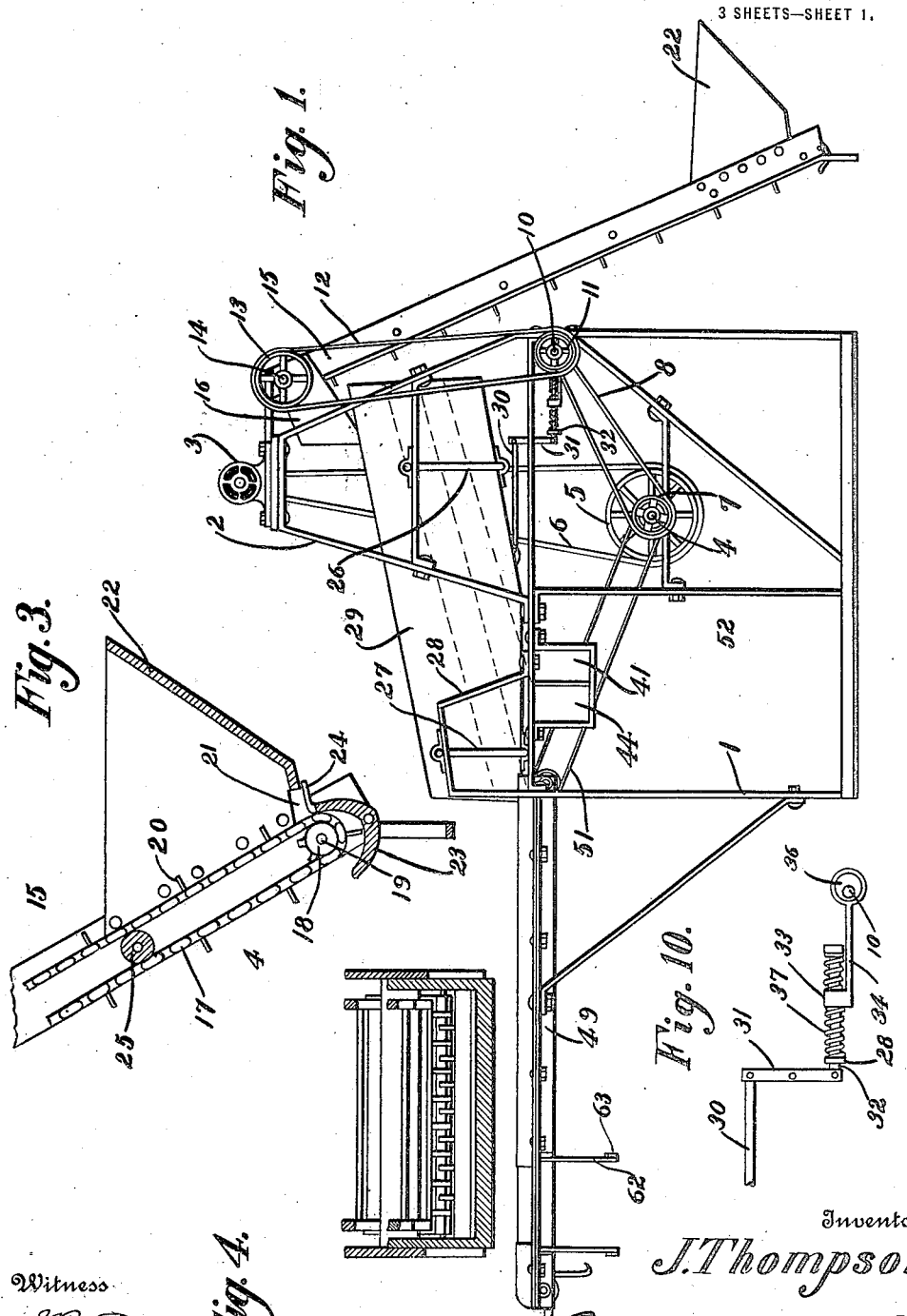
Inventor
J. Thompson.
Witness
By
Attorneys

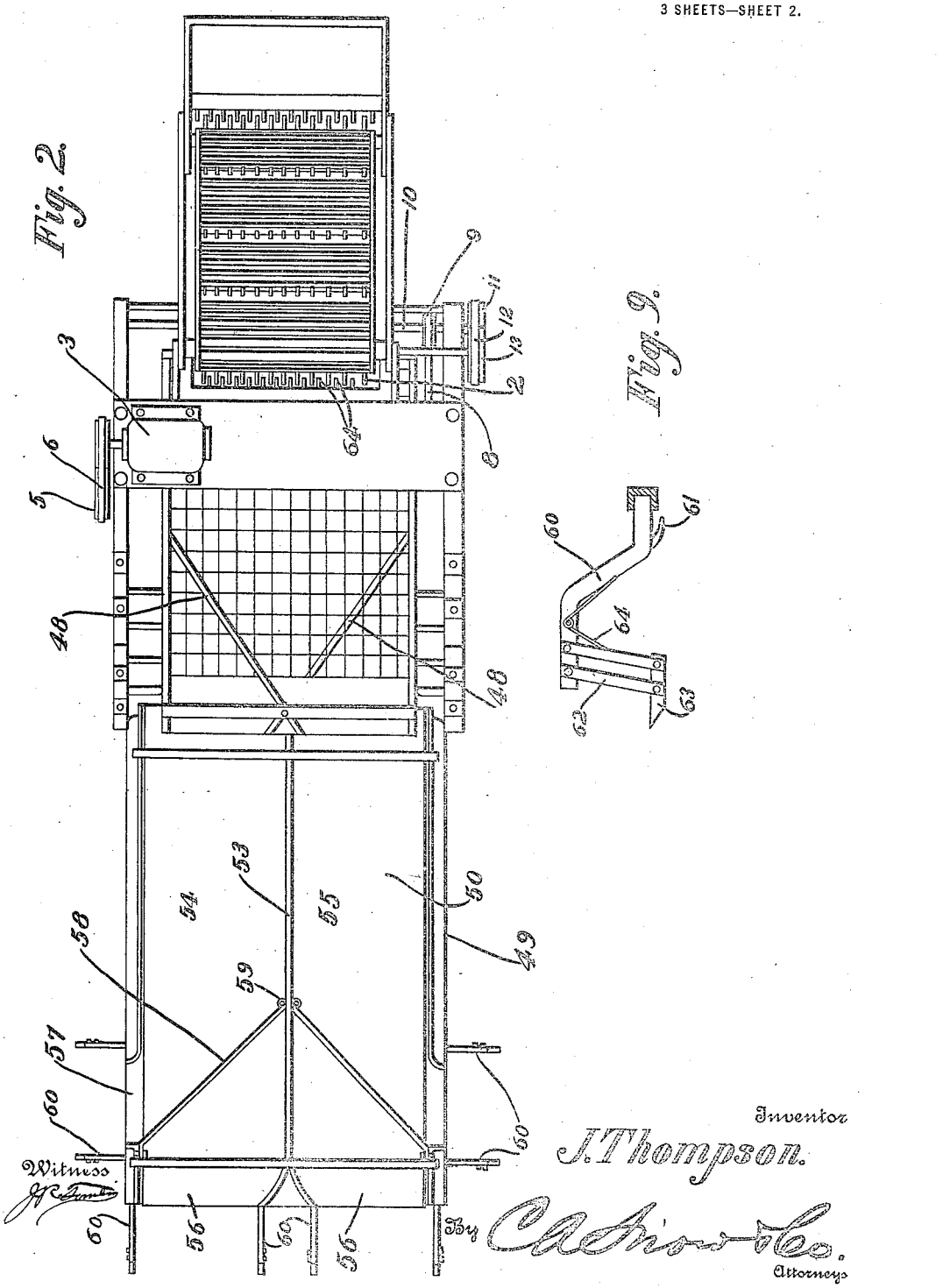

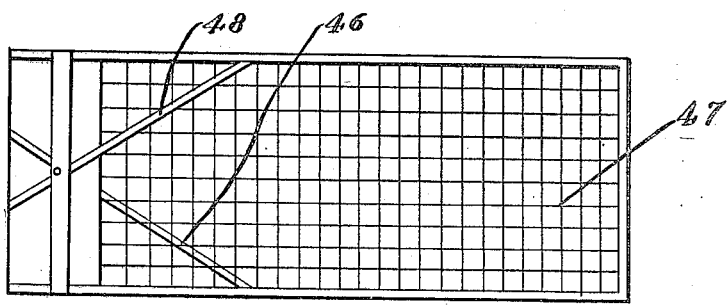
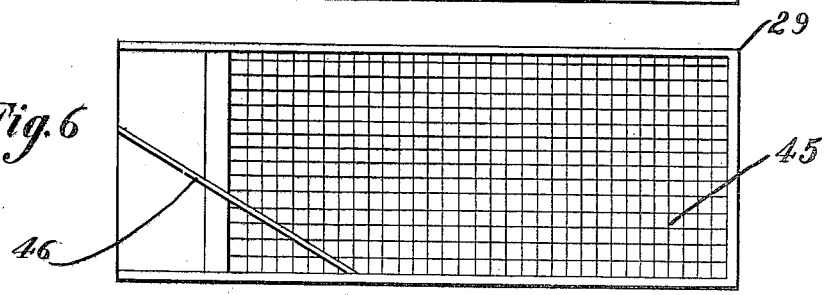
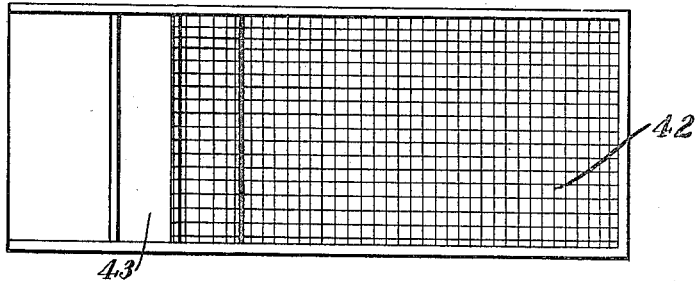
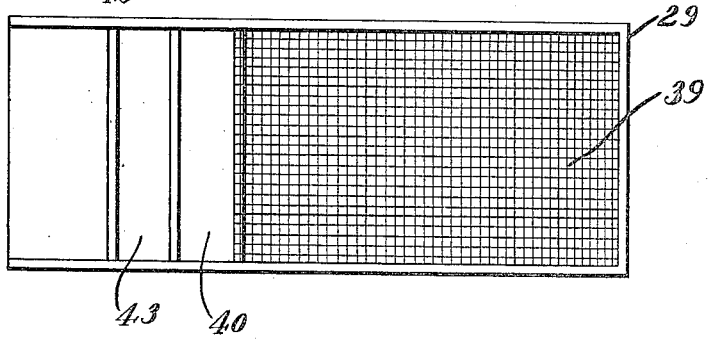

Patented Oct. 10, 1922.

1,431,270

UNITED STATES PATENT OFFICE.

JAMES THOMPSON, OF GREELEY, COLORADO.

POTATO-GRADING MACHINE.

Application filed May 29, 1920. Serial No. 385,259.

*To all whom it may concern:*

Be it known that I, JAMES THOMPSON, a citizen of the United States, residing at Greeley, in the county of Weld and State of Colorado, have invented a new and useful Potato-Grading Machine, of which the following is a specification.

This invention relates to machines for grading potatoes and the like, one of the objects of the invention being to provide a machine of this character which will automatically elevate the potatoes from a hopper without allowing any of the potatoes to escape downwardly, there being a trap operating automatically at the bottom of the hopper and controlled by the elevator.

A further object is to provide means whereby the potatoes, when delivered from the elevator, will be directed positively to the grader without danger of dropping between the elevator and grader.

A still further object is to provide a novel arrangement of superposed screens for directing potatoes of different grades to different outlets.

A still further object is to provide means whereby the potatoes of certain grades can be successively discharged from either of two outlets so that while a bag or other receptacle is being filled at one outlet, another bag or receptacle can be removed from the other outlet and a new one substituted ready for use when necessary.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the grader.

Figure 2 is a plan view thereof.

Figure 3 is an enlarged vertical section through the hopper and adjacent parts of the elevating mechanism.

Figure 4 is a section on line 4—4, Figure 3.

Figure 5 is a plan view of the upper screen of the separator.

Figure 6 is a plan view of the second screen of the separator or grader.

Figure 7 is a plan view of a third screen of the separator or grader.

Figure 8 is a plan view of the bottom screen of the separator.

Figure 9 is a detail view of one of the bag holding fingers.

Figure 10 is a detail view of the box agitating mechanism.

Referring to the figures by characters of reference 1 designates a suitable supporting frame provided with a suitable super-structure 2 on which is mounted a motor 3. A shaft 4 is journaled within the supporting structure 1 and has a pulley 5 which receives motion, through a belt 6, from the motor 3. Another pulley 7 is secured to the shaft 4 and transmits motion, through a belt 8 to a pulley 9 secured to a cross shaft 10 carried by the structure 1. A second pulley 11 is mounted on the shaft 10 and transmits motion through a belt 12 or the like to a pulley 13 secured to a cross shaft 14 journaled in the upper portion of the super-structure 2. The shaft 14 extends transversely across the upper portion of an elevator frame 15 and from this upper portion extends a delivery spout 16 which projects into the super-structure 1. The shaft 14 supports the upper portion of an endless conveyor 17 which extends downwardly within the frame 15 and is mounted, at its lower end, upon sprockets 18 carried by a shaft 19. This conveyor has outstanding fingers 20 and these fingers are adapted successively to move through an opening 21 formed in the bottom of a feed hopper 22 which is carried by the lower portion of the frame 15.

Pivotally mounted within the lower portion of the frame 15 is an arcuate gate or cut-off 23 which straddles the lower portion of the elevator 17 and has outwardly extending fingers 24 at one end which normally rest under the opening 21. One end of this cut-off constitutes a weight for holding the fingers normally in closing position, said fingers being close enough together to prevent the contents of the hopper 22 from escaping through the opening 21. The normal position of the cut-off has been illustrated in Figure 3.

Suitable idler sprockets 25 can be arranged wherever desired along the elevator for guiding and supporting the same during the operation thereof.

A U-shaped hanger 26 is carried by the superstructure 2 and another hanger 27 is carried by supporting frames 28 mounted on the structure 1. Supported by these hangers is a box or housing 29 to the bottom of which is connected a rod 30. This rod is pivotally attached to one arm of a lever 31 carried by the structure 1. The other arm of this lever has a rod 32 pivoted to it and slidable within a sleeve 33 carried by a rod 34. This last named rod is adapted to be actuated by an eccentric 36 secured to the shaft 10 as shown in detail in Figure 10. Springs 37 are mounted on the rod 32 at opposite sides of the sleeve 33 and bear against collars 38 carried by the rod 32. Thus when the shaft 10 rotates motion is transmitted therefrom to the rod 34 which is caused to reciprocate and to transmit motion through the springs 37 to rod 32 and lever 31. As a result the box 29 will be oscillated rapidly thereby to agitate the contents thereof and keep them in motion. It is to be understood of course that the box 29 is inclined downwardly away from that end into which the spout 16 discharges, as shown in Figure 1.

Arranged within the lower portion of the box 29 is a screen 39 which extends downwardly to a transverse outlet opening 40 in the bottom of the box and which is located above a delivery spout 41 suspended below and extending transversely of the box, this box being preferably mounted on the superstructure 2 although if preferred it can be carried directly by the bottom of the box. Spaced from and located above the screen 39 is a screen of coarser mesh and which has been indicated at 42. This latter screen extends forwardly beyond the opening 40 thereunder and up to another transverse opening 43 provided in the bottom of the box, this latter opening being arranged above another delivery spout 44 located beside the spout 41.

A third screen of still coarser mesh and which has been indicated at 45 is spaced from and located above the screen 42 and has a deflecting strip 46 extending obliquely over one of the lower corner portions thereof as shown in Figure 6 so that all articles passing over the screen 45 will come against this strip 46 and be deflected toward one side of the box 29. A screen of still coarser mesh, indicated at 47 is spaced from and located above the screen 45 and has a deflecting strip 48 arranged diagonally over one corner portion of the lower end thereof and adapted to deflect articles laterally when brought into contact therewith, this deflecting strip 48 being disposed oppositely to the strip 46 as will be clearly seen by referring to Figures 5 and 6. From the foregoing it will be apparent that when potatoes or the like are directed onto the screen 47, all but the largest grade will pass through said screen. Potatoes of the largest grade will roll over the screen and against the strip 48 and be deflected toward the left of the box 29 by the strip 48. The second screen 45 will retain the second grade of potatoes while the smaller ones will pass therethrough. These potatoes of the second grade will roll downwardly against the strip 46 and be deflected thereby toward the right of the box 29. The screen 42 will retain the potatoes of the third grade and these will roll downwardly to the outlet opening 43 and thence to the spout 44. The smallest grade of potatoes will pass along the screen 39 through the opening 40 and thence to the spout 41 while dirt and the like separated from the potatoes will fall through the screen 39 and to the ground.

A table 49 is extended from the supporting structure 1 and is provided with an endless apron 50 adapted to be driven by a belt 51 or the like receiving motion from a pulley 52 on the shaft 4. This apron extends throughout the width of the table and supported above the apron is a central longitudinal partition 53 forming parallel passages 54 and 55 respectively. The first grade of potatoes deflected by the strip 48 will be directed into the passage 55 while the second grade of potatoes, deflected by the strip 46 will travel into the passage 54. Each passage has its outer end open, as shown in Figure 6 and also has a third opening 57. A gate 58 is pivotally connected to each side of the partition 53, as shown at 59 and is adapted to swing to either of two positions. When in one of these positions the gate extends across the passage and up to the outer side wall thereof so that potatoes directed into the passage will be deflected by the gate to the side outlet 57. When the gate is in its other position it bears against the partition 53 so as to allow the potatoes or the like to pass directly through the outlet 56 at the end of the passage. The free ends of the gates 58 are bolted or otherwise detachably secured to the side walls of the table 49 as shown clearly in Fig. 2, to prevent the potatoes or other articles flowing out through the side openings 57 from moving said gates. When it is desired to discharge through the openings 56, the bolts are removed and the gates 58 swung inward against the partition 53.

Arranged adjacent the side outlet 57 and the end outlet 56 are bag holding devices. These can be of the form shown in Figure 9. By referring to said figure it will be seen that an outwardly and upwardly inclined arm 60 is employed, the same being extended from the table 49. From the inner end of the arm extends a bag engaging hook 61 while depending from the upper or outer end of the arm are parallel strips 62 pivotally connected to the arm and provided, at their lower ends, with a pointed foot 63. A spring 64 is mounted on the arm and exerts a pressure against the strips 62 so as to thrust the foot 63 normally away from the hook 61. Obviously by placing one side of a bag in engagement with the hook 61 and the other side in engagement with the foot 63, and then releasing the foot, the spring 64 will move the foot 63 outwardly away from the hook 61, thus holding the upper end of the bag open so that it will properly receive the potatos as delivered from the table.

It is thought that the operation of the machine will be obvious. When the parts are set in motion and the potatoes are placed in the hopper 22, the fingers on the elevator will come successively against the cutoff 23 and swing it backwardly under the hopper 22 so that the fingers 24 will slide outwardly and allow the fingers 20 to pass through the opening 21. Here the fingers will move under certain of the potatoes and hand them upwardly, the fingers 24 promptly moving to shut position until the next set of fingers 20 come against the cut-off 23. As the elevator continues to operate the fingers thereof will convey the potatoes upwardly and deliver them to the chute 16, there being deflecting fingers 64 extending from the bottom of the chute and between the paths of the fingers 20, as shown particularly in Figure 2 so that potatoes will not be discharged downwardly between the elevator and the chute. As the potatoes are delivered to the chute 16 they will roll downwardly into the box 29 and onto the upper screen 47. As the box is agitated rapidly although given but a slight movement, the potatoes will be kept in motion and will be graded as hereinbefore described. As the apron 50 is continuously traveling outwardly away from the screens, the potatoes are directed thereunto will pass through the passages 54 and 55 and outwardly through the outlet 57 or 56. Importance is attached to the provision of two outlets for each passage because while potatoes are being directed into a sack held at one of these outlets, a filled sack can be removed from the other outlet of the same passage and an empty one substituted therefor. Thus a continuous sacking of the potatoes can be carried on, the potatoes being directed first to one outlet and then to the other.

What is claimed is:

In a machine of the class described the combination with an endless conveyor apron and a table for supporting the same, said table having upstanding sides, of a longitudinal partition supported above the apron to form parallel passages, there being outlet openings at the sides of the table adjacent the delivery end thereof and outlet openings between the delivery ends of the partition and the sides of the table, a gate hingedly mounted on each side of the partition and movable against the partition to open the passages to the end outlet and obliquely of the passages to direct the contents of the passages to the side openings, and grading means for directing articles of different grades into the respective passages.

In testimony that I claim the foregoing as my own, I have hereto affixed my signature in the presence of two witnesses.

JAMES THOMPSON.

Witnesses:
CHAS. E. SOUTHARD,
HENRY CANDLIN.